United States Patent
Muller et al.

(10) Patent No.: US 9,020,306 B2
(45) Date of Patent: Apr. 28, 2015

(54) STABLE LITHIUM NIOBATE WAVEGUIDE DEVICES, AND METHODS OF MAKING AND USING SAME

(71) Applicant: The Aerospace Corporation, El Segundo, CA (US)

(72) Inventors: Heinrich G. Muller, Rancho Palos Verdes, CA (US); Andrew D. Stapleton, Pasadena, CA (US)

(73) Assignee: The Aerospace Corporation, El Segundo, CA (US)

( * ) Notice: Subject to any disclaimer, the term of this patent is extended or adjusted under 35 U.S.C. 154(b) by 34 days.

(21) Appl. No.: 13/830,777

(22) Filed: Mar. 14, 2013

(65) Prior Publication Data

US 2014/0270617 A1 Sep. 18, 2014

(51) Int. Cl.
*G02F 1/035* (2006.01)
*G02F 1/01* (2006.01)

(52) U.S. Cl.
CPC ................................ *G02F 1/0115* (2013.01)

(58) Field of Classification Search
USPC ........................................................ 385/2–3
See application file for complete search history.

(56) References Cited

U.S. PATENT DOCUMENTS

| | | | |
|---|---|---|---|
| 5,214,724 A | 5/1993 | Seino et al. | |
| 5,404,412 A | 4/1995 | Seino et al. | |
| 5,680,497 A | 10/1997 | Seino et al. | |
| 7,231,101 B2 | 6/2007 | Nagata | |
| 7,343,055 B2 | 3/2008 | McBrien et al. | |
| 7,809,217 B2 | 10/2010 | Kuratani et al. | |
| 8,189,981 B2 | 5/2012 | Muller et al. | |
| 2006/0023288 A1* | 2/2006 | McBrien et al. | 359/245 |
| 2010/0232736 A1* | 9/2010 | Ichikawa et al. | 385/2 |

OTHER PUBLICATIONS

Nagata et al., "Dc drift reduction in LiNbO3 optical Modulators by decreasing the water content of vacuum evaporation deposited SiO2 buffer layers," Communications (1998).
Nagata et al., "DC Drift of Z-Cut LiNbO3 Modulators," IEEE Photonics Technology Letters, 16(7):1655-1657 (2004).
Salvestrini et al., "Analysis and Control of the DC Drift in LiNbO3-Based Mach-Zehnder Modulators," Journal of Lightwave Technology, 29(10):1522-1534 (2011).
Wooten et al., "A Review of Lithium Niobate Modulators for Fiber-Optic Communications Systems," IEEE Journal of Selected Topics in Quantum Electronics, 6(1):69-82 (2000).

* cited by examiner

*Primary Examiner* — Eric Wong
(74) *Attorney, Agent, or Firm* — Jones Day; Jaime D. Choi

(57) ABSTRACT

Embodiments of the present invention provide stable lithium niobate waveguide devices, and methods of making and using the same. A lithium niobate-based waveguide device may include a Z-cut lithium niobate substrate having upper and lower surfaces, an optical waveguide embedded within the lithium niobate substrate, a signal electrode disposed on the upper surface of lithium niobate substrate and parallel to the optical waveguide, guard electrodes disposed on the upper surface of the lithium niobate substrate and flanking but spaced apart from the signal electrode, and a conductive layer on the lower surface of the lithium niobate substrate, wherein the conductive layer serves as a common ground reference for the signal and guard electrodes.

21 Claims, 14 Drawing Sheets

STABLE LITHIUM NIOBATE WAVEGUIDE DEVICES, AND METHODS OF MAKING AND USING SAME

FIELD OF THE INVENTION

This application generally relates to lithium niobate waveguide devices, and methods of making and using the same.

BACKGROUND OF THE INVENTION

Electro-optically active waveguide devices, such as modulators, have been prepared using lithium niobate ($LiNbO_3$). Lithium niobate has a lattice structure in which the lithium ions have a non-centrosymmetric position. In the absence of an electric field, this non-centrosymmetric position imparts the material with a net polarization. Applying an electric field to the lithium niobate shifts the position of the lithium ions, changing the net polarization, and refractive index, of the material. Thus, the phase of light propagating through the material may be altered by applying an electric field to the material.

FIGS. 1A-1B schematically illustrate plan and cross-sectional views, respectively, of a previously known lithium niobate waveguide device 100 that includes lithium niobate substrate 101 in which waveguide 102 is formed, input optical fiber 111, output optical fibers 112, and voltage generator 121. Waveguide 102 may be formed by exchanging protons for some of the lithium ions in the substrate 101 within defined areas, e.g., by immersing the substrate into a solution containing a proton exchange acid, such as benzoic acid. The proton-exchanged areas have a higher extraordinary refractive index than the remainder of the substrate, and so act as a waveguide 102 that transports light through substrate 101 with relatively low loss. In the illustrated modulator 100, light is introduced to waveguide 102 through input optical fiber 111. Junction 105 of waveguide 102 divides the light into two portions and respectively guides the light portions into sections 106 and 107 of waveguide 102. Electrodes 122 are positioned on either side of the waveguide sections 106, 107, and separated from the waveguide sections by buffer regions 103. In one example, the inner edges of the electrodes are spaced approximately 10 microns from each other, with sections 106 or 107 therebetween.

Voltage generator 121 is programmed to independently apply voltages to different pairs of the electrodes 122, so as to change the phase of the light traveling through the waveguide section 106 or 107 adjacent that pair. For example, as illustrated in FIG. 1B, waveguide section 106 has a net polarization 104 in the absence of an electric field. Voltage generator 121 (not shown in FIG. 1B) may apply a voltage across electrodes 122, which generates an electric field along the crystallographic Z-axis to change the net electrical polarization 104 of waveguide section 106, which induces a phase change of light traveling through that section, and an equal change of polarization in waveguide 107 (not shown in FIG. 1B), but of opposite sign. The magnitude of the change in the material's net polarization and the magnitude of the phase change, may be proportional to the applied electric field. The light in waveguide sections 106, 107, may be coupled out of waveguide 102 and into separate output optical fibers 112, as illustrated in FIG. 1A.

Alternatively, in modulator 100' illustrated in FIG. 1C, the light in sections 106', 107' of waveguide 102' may instead be recombined at junction 108', where they interfere with one another. Because the relative phase of the light portions traveling through waveguide sections 106', 107' may be controlled via voltage generator 121', the intensity of the light at junction 108' may be modulated as desired. For example, if the portion of light in section 106' is phase delayed by an even multiple of $\pi$ relative to that in section 107', then the two portions of light will constructively interfere with each other, yielding maximum brightness. Or, for example, if the portion of light in section 106' is phase delayed by an odd multiple of $\pi$ relative to that in section 107', then the two portions will completely interfere with each other, yielding minimal brightness. Any intensity in between may be selected by suitably adjusting the relative phase delays via voltage generator 121'. The output of waveguide 102' is coupled into a single output optical fiber 112'. Configurations such as that illustrated in FIG. 1C may be referred to as a Mach-Zehnder modulator (MZM). Waveguide configurations other than those illustrated are also common.

One choice encountered in designing a lithium niobate-based modulator is the orientation of the crystal axes relative to the waveguides and electrodes, which affects the modulator efficiency. Specifically, lithium niobate primarily is used in one of two main crystallographic orientations: X-cut or Z-cut. The term X-cut or Z-cut refers to the surface-normal of the wafer being parallel to the X or Z crystallographic axes, respectively. The strongest component of the applied electric field preferably is aligned with the Z-axis of the crystal, which has the highest electro-optic coefficient. Whether an X-cut or Z-cut lithium niobate crystal is used, the electrodes preferably are arranged on either side of the waveguide. Because the ground electrodes reside on the same plane as the driving or bias electrodes, the applied electric field lines tend to be substantially parallel to the major planar surface of the device.

X-cut based modulators are particularly susceptible to charge accumulation on the surface of the crystal. For example, charge generation and charge redistribution may occur when a bias voltage is applied to an electrical input of a lithium niobate-based modulator. The bias voltage may cause the movement of mobile charges, in the form of electrons, holes, or ions, which may accumulate on the surface near the electrodes and either may counteract the effect of the applied voltage by establishing a positive drift in the bias voltage, or may enhance the applied bias voltage by establishing a negative drift in the bias voltage. Accordingly, the optimal bias voltage applied to the waveguide device may change with time. As a consequence, the outgoing light from the modulator also may deviate from the optimal output over time.

To compensate for drifts in the bias voltage, also known as DC drifts, and thus maintain the optimum bias voltage and optical output, it is common to employ voltage control circuitry. For example, such DC drifts may be electronically compensated for by monitoring the phase and/or intensity of the light output from the waveguide, and adjusting the magnitude of the electric fields to maintain the optical performance. However, the monitoring circuitry required to adjust the applied voltage may add significant expense and complexity to the modulator circuit, may limit the switching speed of the device, and may limit the environments in which the device may be used. Furthermore, as the applied DC bias steadily increases, the electric field between the device electrodes may damage the device materials during long-term operation, particularly at higher temperature. Such damage may further accelerate the DC drift and lead to further degradation in the optical performance of the modulator.

Methods are known in the art for reducing charge accumulation on the surfaces of lithium niobate devices. For example, U.S. Pat. No. 7,343,055 to McBrien discloses that some prior art devices may provide a metal oxide or semiconductor layer on top of the lithium niobate crystal and under the electrodes, so as to bleed off charges through a conductive path to the bottom of the device. McBrien further discloses that other devices may provide a conductive layer on the bottom of the device that is electrically connected with the ground electrodes to provide a discharge path. In addition, McBrien discloses that in such devices, charge accumulating on the signal electrode may find a path to ground through the driver or bias electronics. McBrien discloses addressing such a problem by arranging a first set of highly conductive RF electrodes as a transmission line on the top of the buffer layer, and maintaining a prescribed operating point by a second set of low conductivity electrodes in contact with the lithium niobate substrate. McBrien discloses that the electrodes located on the surface of the substrate, having an electrical connection to external terminals, can be used to eliminate substrate charging. McBrien further discloses that in Z-cut embodiments, the bias electrodes must be positioned above the optical waveguides to achieve the required electric field configuration, but that such an arrangement results in excessive optical loss. McBrien discloses that splitting the bias electrodes into two sections may reduce the optical loss, but results in a trade-off with modulation efficiency.

U.S. Pat. No. 7,231,101 to Nagata discloses use of a dielectric buffer layer to suppress absorption of propagating light that may be caused by a conductive overlayer. Nagata discloses that one of the plausible interactions between the charge bleed layer and the buffer layer is an enhancement of chemical defect generation at the interface of these layers, which may enhance electrical breakdown via the interface and cause the unwanted DC drift phenomenon.

Other methods for reducing charge accumulation are known. For example, U.S. Pat. Nos. 5,404,412 and 5,680,497, both to Seino, disclose reducing the effect of charge accumulation in a buffer layer by doping the buffer layer so as to enhance its conductivity. Nagata discloses the use of charge bleed-off layers and diffusion-inhibiting blocking layers to mitigate bias stability issues.

U.S. Pat. No. 5,214,724 to Seino discloses an optical waveguide device that includes a third electrode placed on the device surface, spaced from the pair of driving electrodes, and connected to a DC or low frequency voltage or to ground. Seino discloses that the third electrode concentrates the dispersed electric field in the vicinity of the signal electrode by causing a voltage drop that is proportional to the distance between the signal and the electrode and the third electrode.

What is needed is a lithium niobate waveguide device with improved stability.

SUMMARY

The present invention provides lithium niobate waveguide devices having improved stability, and methods of making the same. Specifically, the present waveguide devices may include a Z-cut lithium niobate substrate, and an optical waveguide embedded within the lithium niobate substrate. The devices further may include a signal electrode disposed on the upper surface of the substrate, and a pair of guard electrodes disposed on the upper surface of the substrate and flanking the signal electrode. The devices further may include a conductive layer disposed on the lower surface of the substrate and serving as a common ground electrode for the signal and guard electrodes. Because the signal and guard electrodes are above the waveguide and the ground electrode is below the waveguide, the electric fields induced between the electrodes are kept away from and are normal to the surface of the device, thus inhibiting charge formation and charge current at that surface. In addition, the guard electrodes may push the buildup of any space charges to regions away from the waveguide. Thus, the formation and redistribution of space charges that otherwise may interfere with the applied electric field in the waveguide may be substantially inhibited, and the bias voltage may be reliably stable over time.

In accordance with one aspect of the invention, a lithium niobate waveguide device with enhanced stability includes a Z-cut lithium niobate substrate having upper and lower surfaces, an optical waveguide embedded within the lithium niobate substrate, a signal electrode disposed on the upper surface of the lithium niobate substrate and parallel to the optical waveguide, a pair of guard electrodes disposed on the upper surface of the lithium niobate substrate and flanking the signal electrode, and a conductive layer disposed on the lower surface of the lithium niobate substrate and configured to provide a common ground for the signal and guard electrodes.

In some embodiments of the invention, the signal electrode, the guard electrodes, and the conductive layer may be formed of any suitable conductive material, for example a metal such as gold, aluminum, copper, silver, titanium, Ti—Ni—Sn—Au, or a gold-tin eutectic material, or a semiconductive material, such as silicon. The guard electrodes may be formed from a material selected independently from that of the signal electrode.

In some embodiments, the lithium niobate substrate has a thickness between 10 microns and 100 microns. In an exemplary embodiment, the lithium niobate substrate has a thickness of 20-30 microns.

Some embodiments optionally include a supportive substrate bonded to the lithium niobate substrate via the conductive layer. The supportive substrate may be thicker than the lithium niobate substrate. In one illustrative embodiment, the supportive substrate is a Z-cut lithium niobate substrate.

The waveguide may include a soft proton-exchanged layer within the substrate. The soft proton-exchanged layer may be formed by exposing the lithium niobate substrate to a proton exchange solution including a proton exchange acid and a lithium salt of the proton exchange acid at a temperature of less than an atmospheric boiling point of the solution, followed by annealing the lithium niobate substrate under a vapor pressure of water preselected to inhibit protons in the substrate from forming water and evaporating from the upper surface of the substrate. The waveguide further may include an overlayer including lithium niobate. The overlayer may be embedded between the upper surface of the lithium niobate substrate and the soft proton-exchanged layer, and may include a substantially defect free region extending between about 10 nm below the upper surface of the substrate and the soft proton-exchanged layer.

In some embodiments, the optical waveguide may be coupled to a light source such as a laser, the signal electrode and guard electrodes may be coupled to a driving signal generator, and the conductive layer coupled to a ground terminal of the driving signal generator. Alternatively, the signal electrode may be coupled to a first driving signal generator, the guard electrodes may be coupled to a second driving signal generator, and the conductive layer coupled to the ground terminals of the first and second signal generators. The signal electrode and the conductive layer may induce an electric field normal to the upper surface of the lithium niobate substrate, and the guard electrodes may keep surface charges away from the signal electrode and the optical waveguide.

Under another aspect of the present invention, a method of making a waveguide device may include providing a Z-cut lithium niobate substrate having an upper surface and a lower surface; forming an optical waveguide within the lithium niobate substrate; and forming a signal electrode on the upper surface of the lithium niobate substrate and parallel to the optical waveguide. The method further may include forming a pair of guard electrodes on the upper surface of the lithium niobate substrate and flanking the signal electrode. The method further may include disposing a conductive layer on the lower surface of the lithium niobate substrate, the conductive layer being substantially under the signal electrode and the guard electrodes and serving as a common ground thereto.

In some embodiments, the method further includes thinning the lithium niobate substrate. Such thinning may include grinding and polishing the lithium niobate substrate. The thickness of the lithium niobate substrate may be between 10 microns and 100 microns, for example.

The conductive layer may include a metal layer, such as aluminum, gold, copper, silver, titanium, Ti—Ni—Sn—Au, or a gold-tin eutectic material.

In some embodiments, disposing the conductive layer on the lower surface of the lithium niobate substrate may include providing a supportive substrate that has an upper surface and a lower surface. The conductive layer may be disposed on at least one of the lower surface of the lithium niobate substrate or the upper surface of the supporting substrate. The lower surface of the lithium niobate substrate may be bonded to the upper surface of the supporting substrate via the conductive layer. The supportive substrate may include a Z-cut lithium niobate substrate.

DETAILED DESCRIPTION

Overview

Embodiments of the present invention provide lithium niobate waveguide devices having a signal electrode and guard electrodes disposed on the upper surface of a Z-cut lithium niobate substrate, and a ground electrode disposed on the lower surface of the lithium niobate substrate. Preferably, the ground electrode is disposed beneath the signal and guard electrodes, and indeed may substantially cover the entire lower surface of the substrate. A first bias may be applied between the signal electrode and the ground electrode, so as to modulate the refractive index of a waveguide disposed therebetween. Concurrently, a second bias (which may be the same as the first bias) may be applied between each of the guard electrodes and the ground electrode. Such an arrangement may inhibit generation of space charges at the Z-surface of the crystal near the waveguide. Moreover, the guard electrodes may draw any mobile charges away from the signal electrodes, thus inhibiting drift in the bias voltage that such charges otherwise may have caused. Indeed, the device may have substantially no bare crystal surface between the signal electrode and the ground electrode at which charges may accumulate. Accordingly, feedback circuitry need not necessarily be used to control the performance of the inventive devices, e.g., to continually adjust the applied voltages to compensate for drifts in performance, as may be needed in previously known devices.

First, an exemplary waveguide device constructed according to one embodiment of the present invention will be described, along with an exemplary arrangement of elements therein. Then, exemplary methods of making such waveguide devices will be described.

Waveguide Structure

Figure 1A:
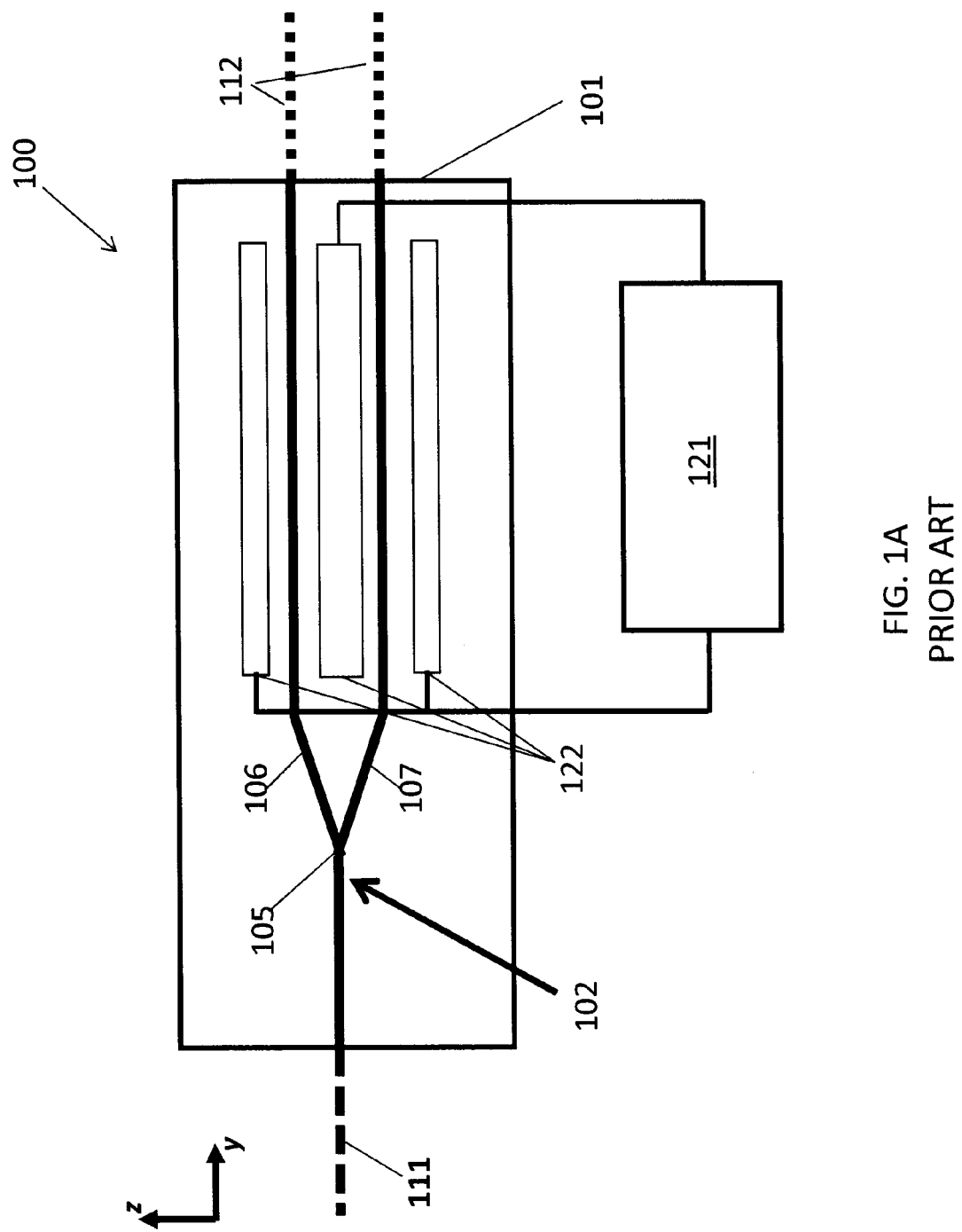
FIGS. 1A-1B schematically illustrate plan and cross-sectional views, respectively, of a previously known lithium niobate waveguide device.
Figure 1B:
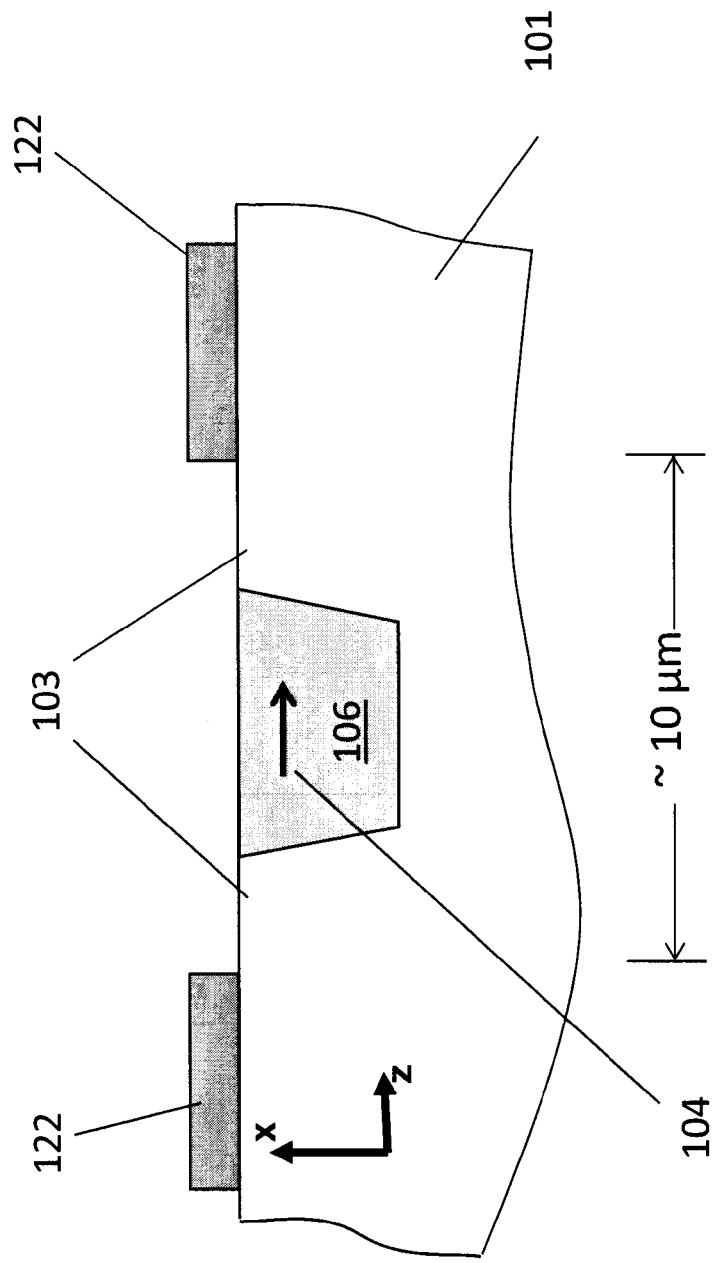
Figure 1C:
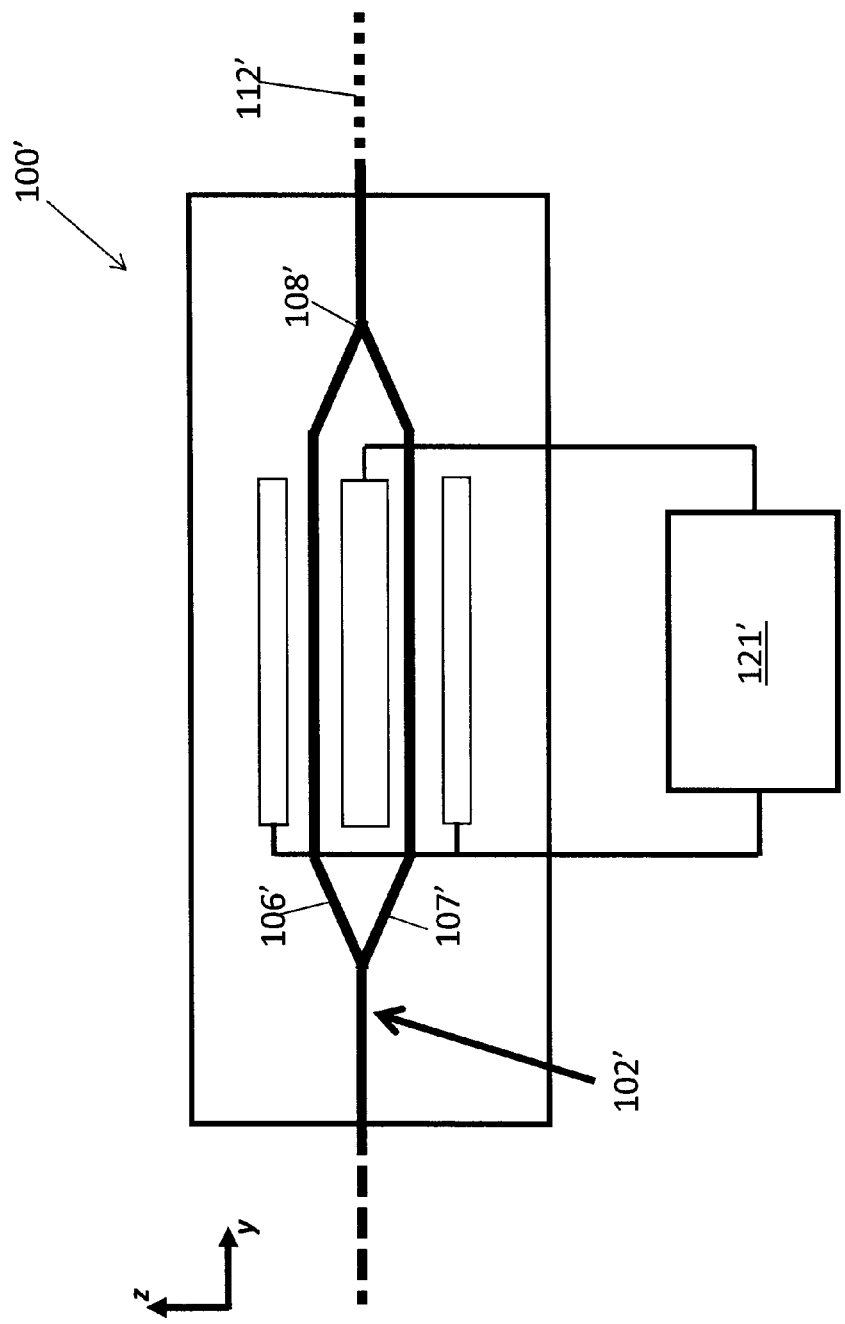
FIG. 1C schematically illustrates a plan view of an alternative previously known lithium niobate waveguide device.
Figure 2:
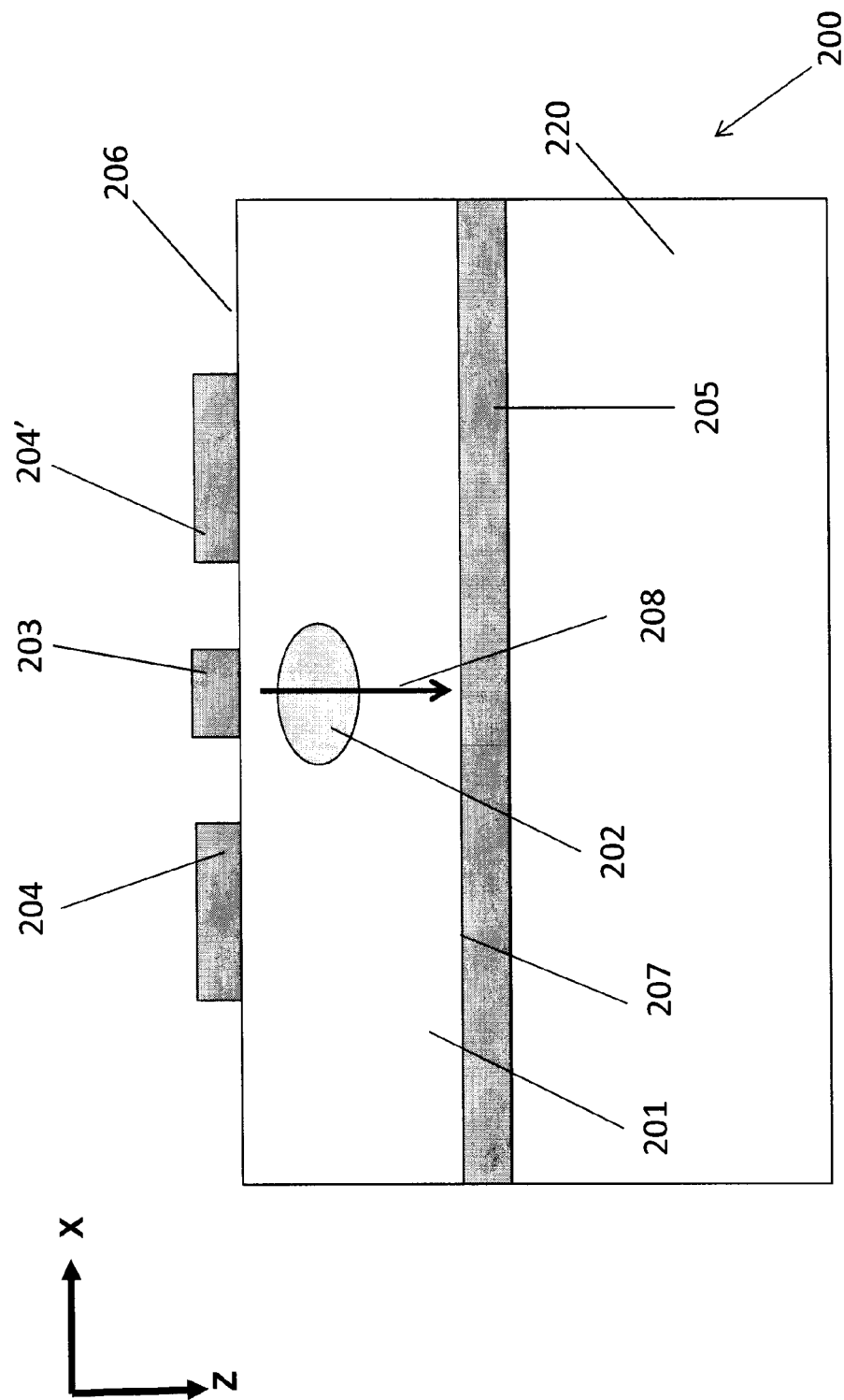
FIG. 2 schematically illustrates a cross-sectional view of a lithium niobate waveguide device, constructed according to an exemplary embodiment of the invention.

With reference to FIG. 2, a cross-sectional view of an embodiment of an exemplary Z-cut lithium niobate waveguide device constructed according to one embodiment of the present invention is shown. Waveguide device 200 includes lithium niobate substrate 201; optical waveguide 202 embedded within lithium niobate substrate 201; signal electrode 203 disposed on upper surface 206 of lithium niobate substrate 201 and parallel to optical waveguide 202; first and second guard electrodes 204, 204' disposed on upper surface 206 of lithium niobate substrate 201 and flanking, but spaced apart from, signal electrode 203; and conductive layer 205 disposed on lower surface 207 of lithium niobate substrate 201 and configured to serve as a common ground electrode for signal electrode 203 and guard electrodes 204, 204'.

In some embodiments, lithium niobate substrate 201 is Z-cut and has a thickness between 10 microns and 100 microns, e.g., between 20-90 microns, or between 30-80 microns, or between 40-70 microns. In one exemplary embodiment, substrate 201 is a Z-cut lithium niobate wafer about 20-30 microns thick. The dimensions of substrate 201 depend on the design of the device, and preferably are sufficient to support optical waveguide 202 and electrodes 203, 204, 204', and 205.

Signal electrode 203 is disposed on upper surface 206 of substrate 201 and may be formed of any suitable conductive material, such as gold, aluminum, copper, silver, titanium, Ti—Ni—Sn—Au, or a gold-tin eutectic material, or a semiconductive material, such as silicon. In some embodiments, signal electrode 203 may have a width between 1-15 microns, and a thickness of about 1-15 microns, or other suitable dimensions.

Guard electrodes 204, 204' are disposed on upper surface 206 of lithium niobate substrate 201 such that they flank, but are spaced apart from, signal electrode 203. Guard electrodes 204, 204' may have the same thickness and may be formed of the same material as signal electrode 203, such as any suitable conductive material, such as gold, aluminum, copper, silver, titanium, Ti—Ni—Sn—Au, a gold-tin eutectic material, or a semiconductive material, such as silicon. In some embodiments, guard electrodes may range from 1-15 microns in thickness, and may have a width between 1-50 microns, for example. Other dimensions of electrodes 204, 204' suitably may be used.

Conductive layer 205 is disposed on lower surface 207 of substrate 201. Preferably, conductive layer 205 is disposed directly beneath all of electrodes 203, 204, 204'. Indeed, in one illustrative embodiment, conductive layer 205 is disposed on substantially the entire lower surface 207 of substrate 201. Conductive layer 205 may be formed of any suitable conductive material, such as gold, aluminum, copper, silver, titanium, Ti—Ni—Sn—Au, or a gold-tin eutectic material, or a semiconductive material, such as silicon. Optionally, supportive substrate 220 may be disposed under conductive layer 205 and bonded to substrate 201 via conductive layer 205. Supportive substrate 220 may physically support lithium substrate 201 so as to reduce the chance of breakage of device 200. To provide adequate support, supportive substrate 220 may be thicker than the lithium niobate substrate. In some embodiments, the supportive substrate is a Z-cut lithium niobate substrate, a glass such as silicon dioxide, or a polymer As illustrated in FIG. 2, lithium niobate waveguide device 200 includes optical waveguide 202 embedded within substrate 201. In some embodiments, waveguide 202 is embedded relatively deep within substrate 201 so as to inhibit interference between the waveguide's electric field and mobile surface charges, and to reduce optical loss that may be caused by coupling of light from waveguide 202 into electrodes 203, 204, 204'. Waveguide 202 is arranged between signal electrode 203 and conductive layer 205, and preferably lies directly below signal electrode 203 where the electric field is more concentrated, so as to achieve greater overlapping of the electric field between electrode 203 and conductive layer 205 with the optical field of light transmitting through waveguide 202, and hence to provide more effective modulation of light in waveguide 202. Waveguide 202 may have a suitable width, e.g., a width similar to that of electrode 203, and a suitable thickness, e.g., between 2 microns and 10 microns.

Optionally, a buffer layer (not illustrated) may be disposed on upper surface 206 of substrate 201 and below electrodes 203, 204, and 204', and may be configured to inhibit light propagating through the optical waveguide from being absorbed in electrodes 203, 204, and 204'. The buffer layer preferably is transparent to light within optical waveguide 202, and preferably has a smaller refractive index than that of optical waveguide 202. The buffer layer may be formed of a suitable dielectric or electrically insulative material, such as silicon dioxide.

Figure 3:
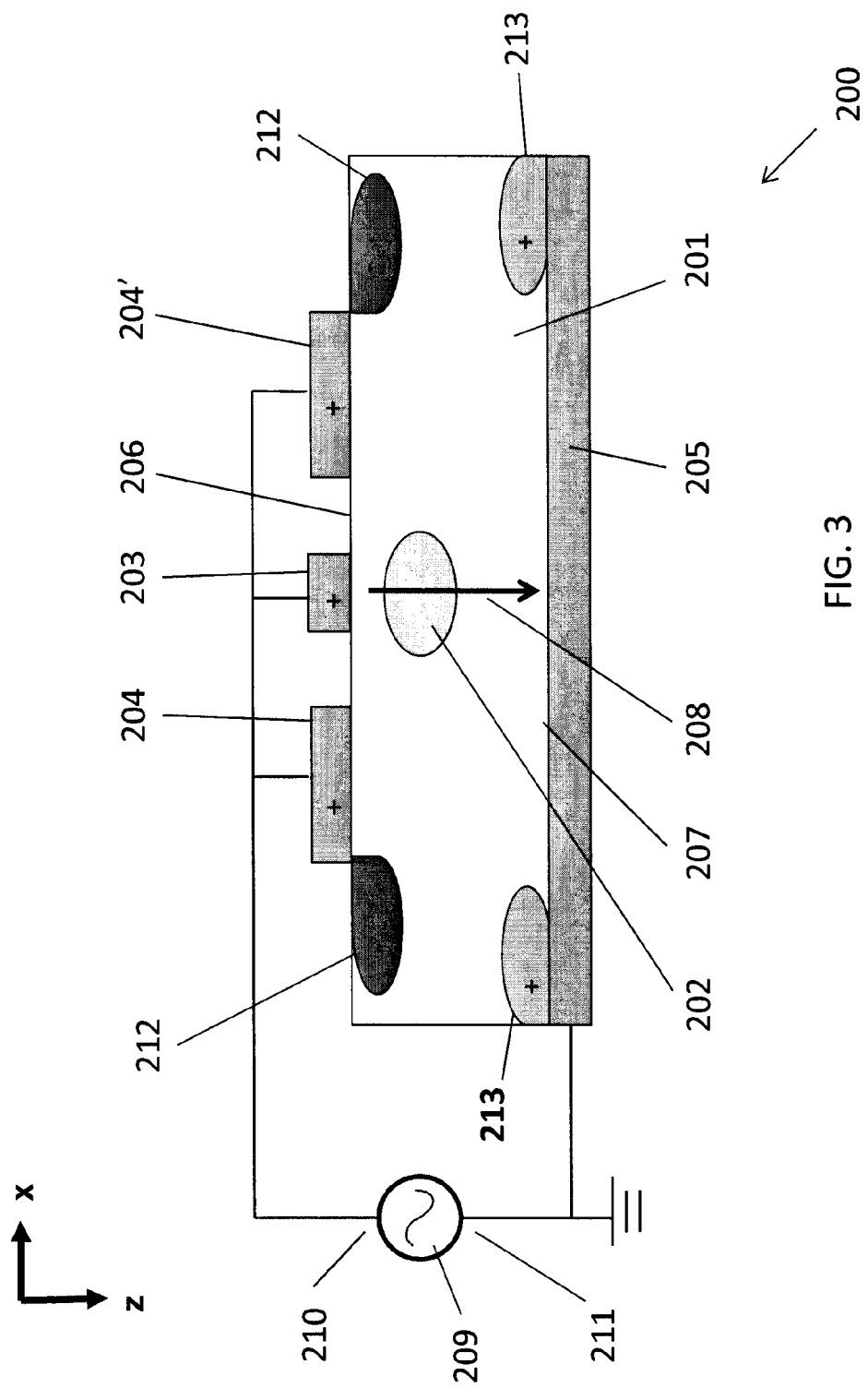
FIG. 3 schematically illustrates charge distributions that may be formed during operation of the device of FIG. 2.

FIG. 3 schematically illustrates charge distributions that may be formed during operation of the device of FIG. 2. Specifically, to utilize waveguide device 200 to modulate an optical signal with a driving signal, signal electrode 203 may be connected to driving signal terminal 210 of driving signal generator 209, and guard electrodes 204, 204' may be connected to the same driving signal terminal 210 as electrode 203. Alternatively, guard electrodes 204, 204' may be connected to a signal source that is different than that of signal electrode 203 and that may be configured to generate a low frequency or DC-bias signal. Conductive layer 205 may be connected to ground terminal 211 of driving signal generator 209 or to the ground terminal of a separate signal source, if employed for guard electrodes 204, 204'.

With such an electrode configuration, conductive layer 205 serves as a ground electrode or ground plane for signal electrode 203 and guard electrodes 204, 204'. As illustrated by arrow 208, the electric field induced between signal electrode 203 on upper surface 206 and conductive layer 205 on the lower surface, is kept away from, and is normal to, upper surface 206 of device 200, thereby inhibiting the formation of mobile surface charges and surface current. Additionally, guard electrodes 204 and 204' working in concert with conductive layer 205 may push, attract, or pull the buildup of space charges to regions 212, 213 away from signal electrode 203 and the optical waveguide 202. Because such an electrode configuration may inhibit formation of mobile surface charges, may inhibit mobile charges from accumulating near optical waveguide 202, and may inhibit surface charges from interfering with the applied electric field, the device is believed to have significantly less susceptibility to DC drift than previously known devices, and its bias voltage is believed to be substantially invariable over time.

Figure 4:
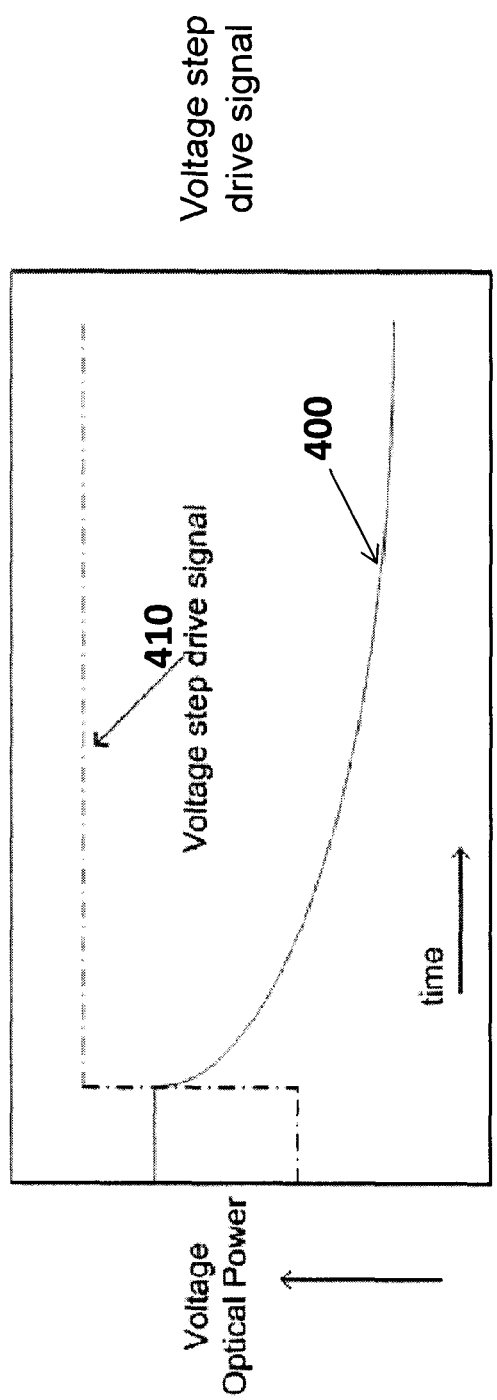
FIG. 4 is a plot illustrating the temporal optical output power response of a previously known lithium niobate waveguide device to a bias voltage drive signal.

FIG. 4 is a plot illustrating the temporal optical output power response 400 of a previously known lithium niobate waveguide device to a bias voltage drive signal 410. The drift time constant may be calculated from the optical output power in response to a voltage step drive signal. The drift time constant ($\tau$) represents the time it takes the device's optical response to reach 1−1/e, or 63.2%, of its final value. A short drift time constant means that the waveguide device suffers from severe performance degradation. The drift amplitude may be calculated by subtracting the actual bias voltage from what the nominal bias voltage would have been had there been no drift.

Figure 5:
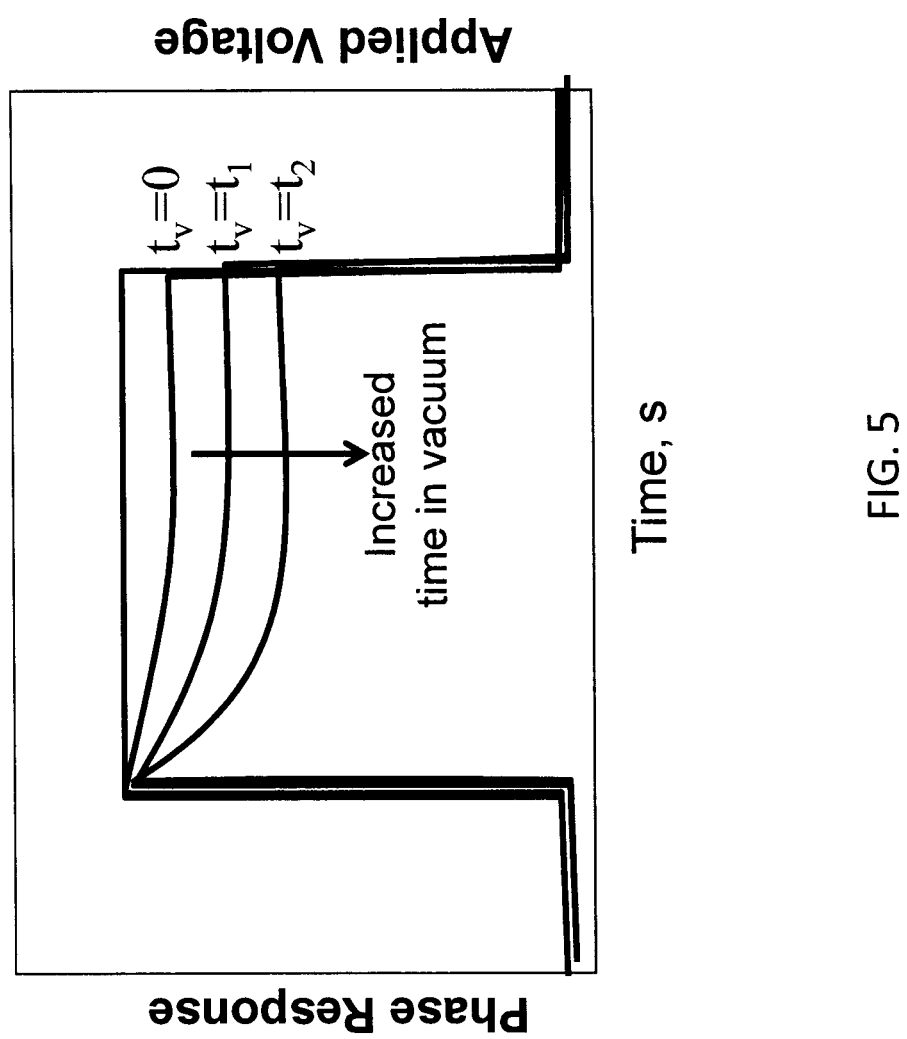
FIG. 5 is a plot illustrating degradation in the temporal optical output response of a previously known lithium niobate waveguide device to a bias voltage drive signal caused by exposure to a vacuum.

FIG. 5 is a plot illustrating degradation in the temporal optical output response of a previously known lithium niobate waveguide device to a bias voltage drive signal caused by exposure to a vacuum. Optical output response is a function of the bias voltage. As time in vacuum increases, surface charges build up on the waveguide device, thereby changing the resistance and capacitance of the device. Hence, the bias voltage also changes, thereby degrading the optical output.

Figure 6:
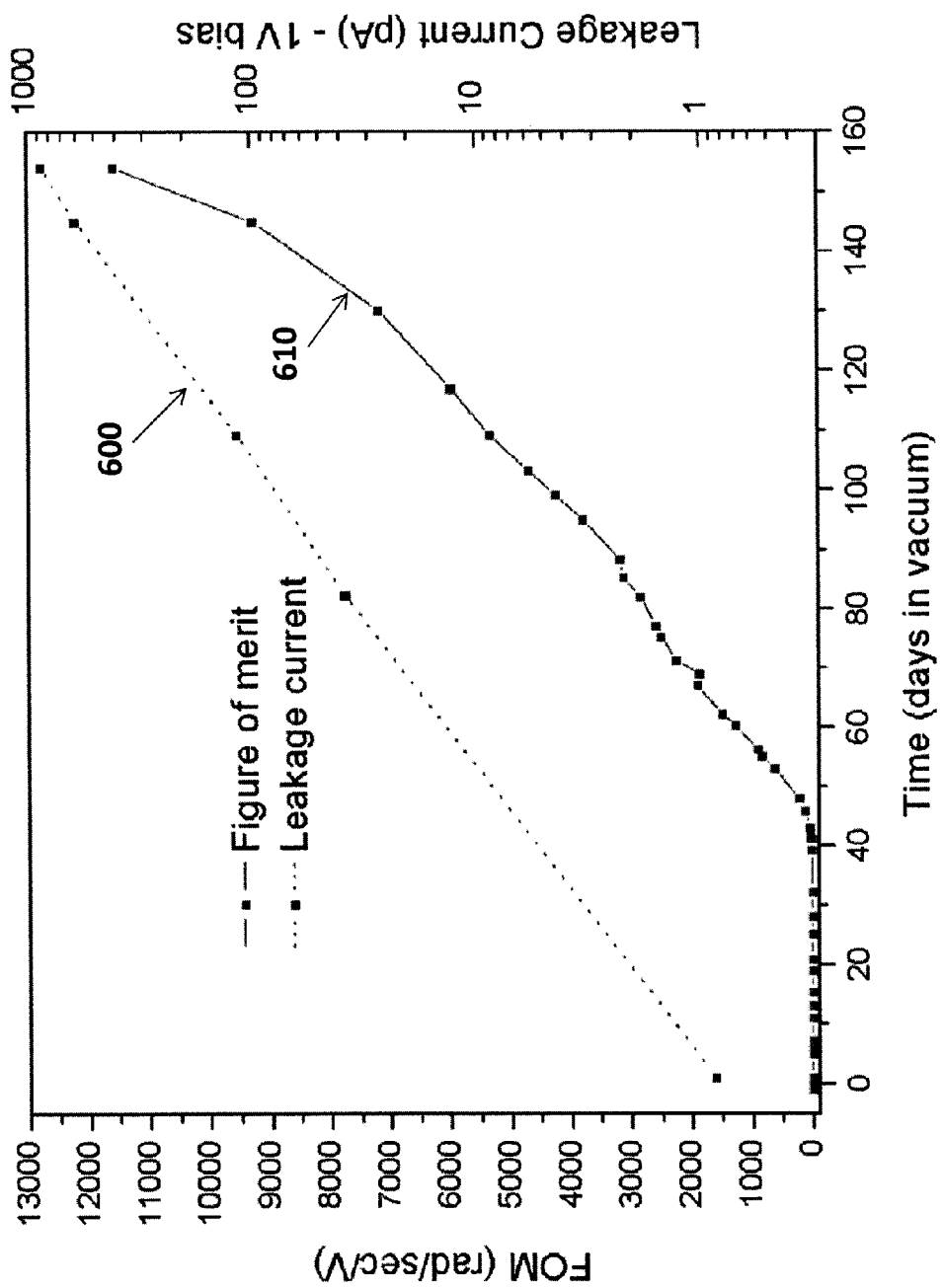
FIG. 6 is a plot illustrating a metrics of performance of a previously known lithium niobate waveguide device during exposure to a vacuum.

FIG. 6 is a plot illustrating metrics of performance 600, 610 of a previously known lithium niobate waveguide device during exposure to a vacuum. Figure of merit (FOM) is a metric for measuring the performance of a device. For lithium niobate waveguide devices, FOM may be defined as $$\text{FOM} = A/(\tau \cdot V) \tag{1}$$

where A is the drift amplitude, $\tau$ is the drift time constant discussed above, and V is the drive voltage. Under this definition, the smaller the drift time constant, the higher the FOM, and the more severe the degradation in device performance. In FIG. 6, FOM 600 may be seen to increase steadily with the device's exposure to vacuum, indicating degradation of performance. Leakage current 610 of the previously known waveguide device is also plotted. It may be seen that leakage current 610 also increases with exposure to vacuum.

Figure 7:
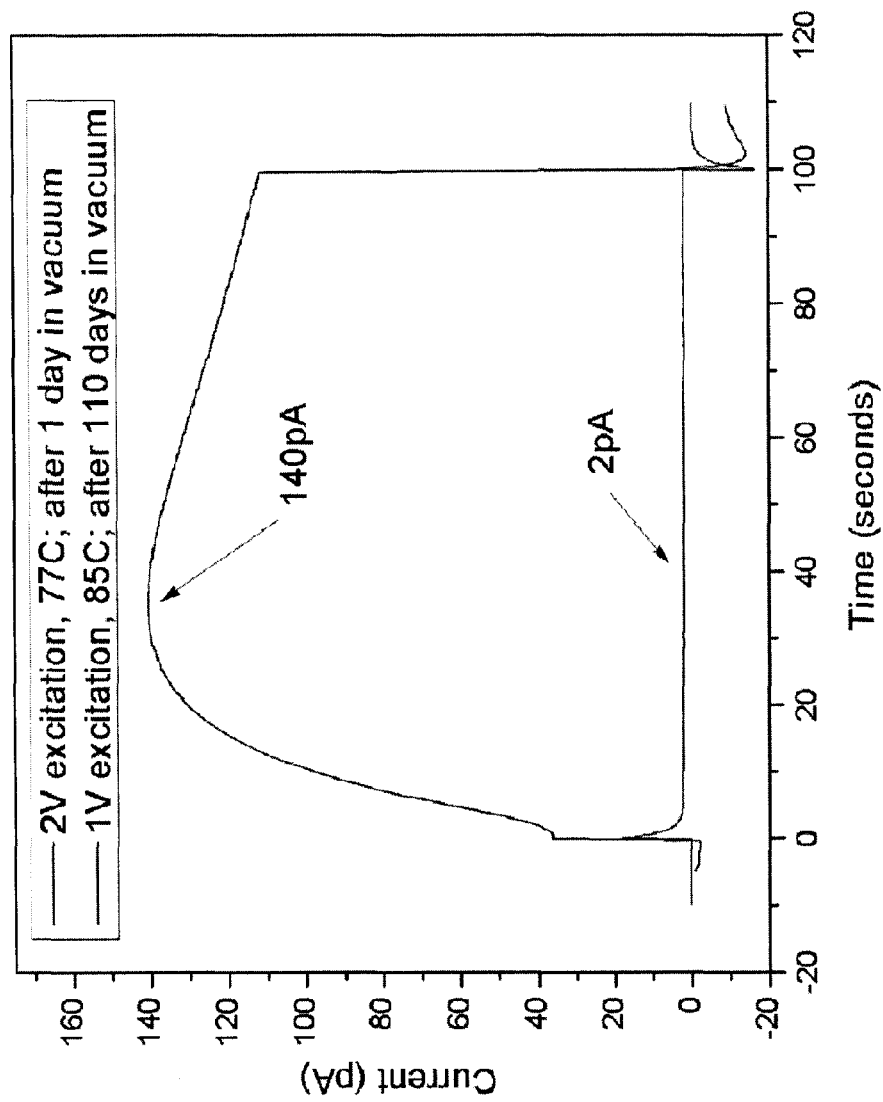
FIG. 7 is a plot illustrating leakage current in a previously known lithium niobate waveguide device during exposure to a vacuum.

FIG. 7 is a plot illustrating leakage current in a previously known lithium niobate waveguide device during exposure to a vacuum. At day 1, a bias voltage of 2 V caused a leakage current of about 2 pA. At day 110, a bias voltage of 1 V causes a leakage current of about 140 pA. Such a result confirms that leakage current develops in previously known waveguide devices in vacuum.

Without wishing to be bound by any theory, it is believed that charge movement in lithium niobate primarily results from crystal imperfections or from surface currents. For example, U.S. Pat. No. 8,189,981 to Muller, the entire contents of which are incorporated by reference herein, discloses a soft proton exchange process for forming lithium niobate waveguides having essentially defect free overlayers. Muller discloses that etching may successfully remove residual defects at the surface of a lithium niobate waveguide formed by the referenced soft proton exchange process, and that a suitably fabricated and etched waveguide may exhibit a conductivity nearly an order of magnitude less than that of an otherwise similar but unetched waveguide. Without wishing to be bound by any theory, it is believed that when lithium niobate crystal imperfections such as defect density have been inhibited during processing, surface currents then may become a primary remaining source of instability.

Indeed, without wishing to be bound by any theory, the present inventors have recognized that reducing formation of surface charges, and reducing currents of such surface charges, suitably may improve stability of lithium niobate waveguide devices. For example, waveguide device 200 in FIG. 3 includes signal electrode 203 and guard electrodes 204, 204' arranged on top of waveguide 202, while conductive layer 205 is disposed below waveguide 202. Applying a bias between signal electrode 203 and conductive layer 205 may concentrate the induced electric field within waveguide 202 instead of near upper surface 206, thereby reducing the formation of mobile surface charges and surface currents. Thus, it is believed that device 200 may exhibit lower electrical conductivity (leakage current) as compared to a previously known lithium niobate waveguide device. Additionally, applying a bias between guard electrodes 204, 204' and conductive layer 205—particularly a bias that is the same as the bias between signal electrode 203 and conductive layer 205—may draw any mobile charges away from signal electrode 203, thereby inhibiting drift in the bias voltage that such charges otherwise may have caused. It is further believed that device 200 may exhibit a longer drift time constant ($\tau$), a lower FOM, and a smaller degradation in device performance than a previously known lithium niobate waveguide device with exposure to vacuum.

Figure 8:
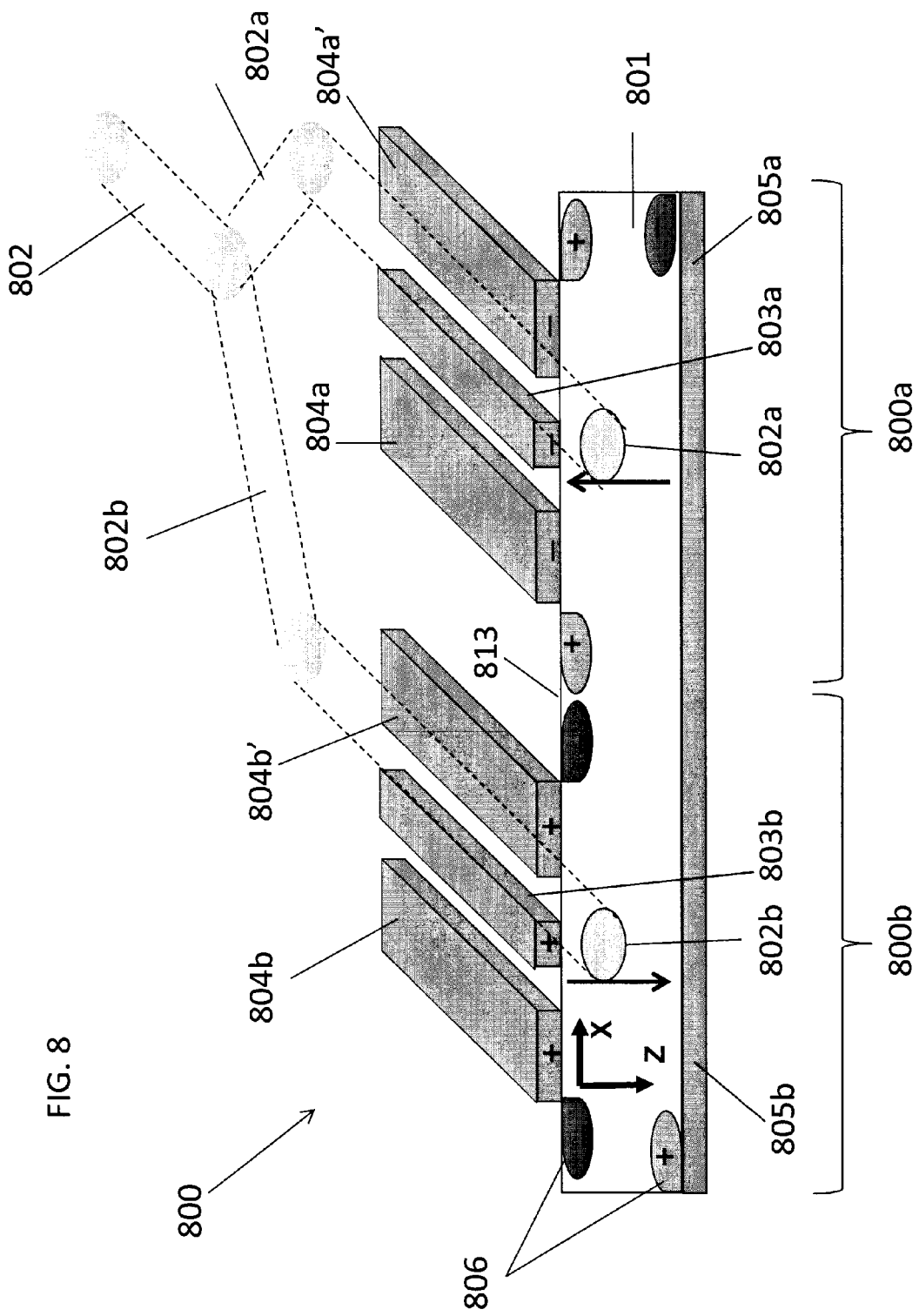
FIG. 8 illustrates a perspective view of an alternative lithium niobate waveguide device, constructed according to one exemplary embodiment of the invention.

FIG. 8 illustrates a perspective view of an alternative lithium niobate waveguide device, constructed according to one exemplary embodiment of the invention. Two stable lithium niobate optical waveguide devices 800a, 800b may be employed in a dual drive Mach-Zehnder modulator (MZM) 800 and may share common substrate 801 and common ground plane 805. Like waveguide device 200 in FIG. 2, each of devices 800a and 800b respectively includes optical waveguide 802a or 802b embedded within common substrate 801; signal electrode 803a or 803b disposed on common upper surface 813 of common substrate 801; and a pair of guard electrodes 804a, 804a' or 804b, 804b' flanking, but spaced apart from the respective signal electrode 803a or 803b. Waveguides 802a, 802b preferably are symmetrical branches of waveguide 802. To utilize MZM modulator 800 to modulate light, the signal and guard electrodes of devices 800a and 800b may be connected to a signal generator in an analogous manner as described above for device 200, except that the signal generator is configured to apply opposite biases to devices 800a and 800b. Conductive layer 805 serves as a common ground electrode for waveguide devices 800a, 800b. Because waveguide 802a is subject to an electric field in opposite direction to that experienced by waveguide 802b, the combined modulation effect in the optical output may improve by a factor of two so that the voltage used to modulate the optical output suitably may be reduced.

Methods of Making Lithium Niobate Waveguide Devices with Enhanced Stability

Figure 9:
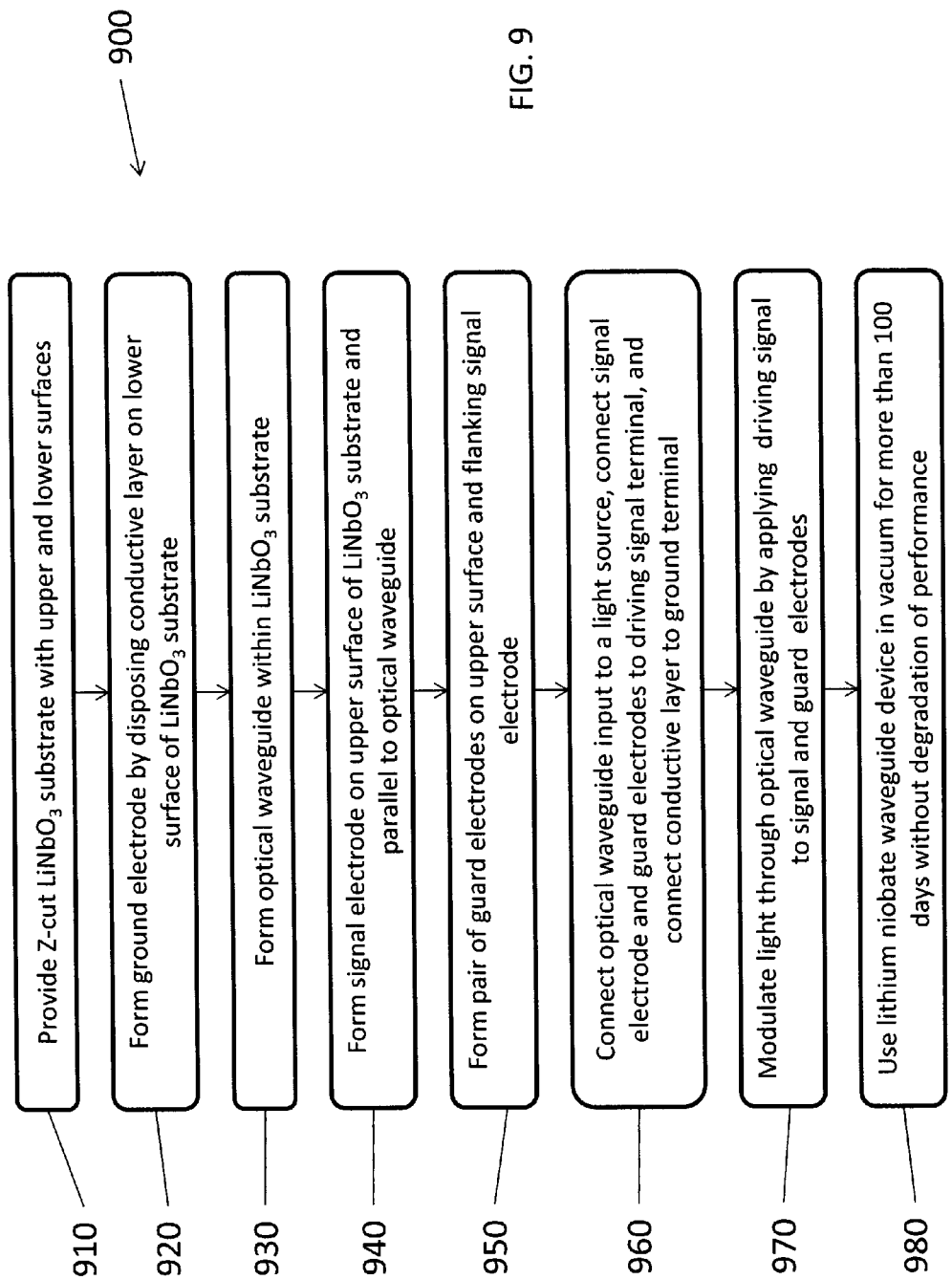
FIG. 9 illustrates steps in an exemplary method of making a lithium niobate waveguide device, according to some embodiments of the present invention.

FIG. 9 illustrates steps in method 900 for forming a lithium niobate waveguide device with enhanced stability, according to some embodiments of the present invention. First, a lithium niobate substrate with upper and lower surfaces is provided (step 910). Substrates that are substantially defect free, and of optical quality, may be commercially purchased, for example, from Crystal Technology, Inc. (Palo Alto, Calif.). In some embodiments, the substrate is a Z-cut lithium niobate crystal having a thickness of 0.5 mm or 1.0 mm. Preferably, the lithium niobate substrate is thinned, e.g., ground and polished, to a thickness between 10 microns and 100 microns to achieve a suitable electric field across the substrate, e.g., between 20-90 microns, or between 30-80 microns, or between 40-70 microns. In one exemplary embodiment, the lithium niobate substrate has a thickness of 20-30 microns.

A ground electrode may be formed by disposing a conductive layer on the lower surface of the lithium niobate substrate (step 920). The conductive layer may be formed using any of a number of known methods of adhering metal to substrate materials, such as electroplating or sputtering, and may be formed of any suitable conductive material, such as gold, aluminum, copper, silver, titanium, Ti—Ni—Sn—Au, or a gold-tin eutectic material, or a semiconductive material, such as silicon. In some embodiments, the ground electrode may have a thickness between 7 microns and 14 microns.

Figure 10:
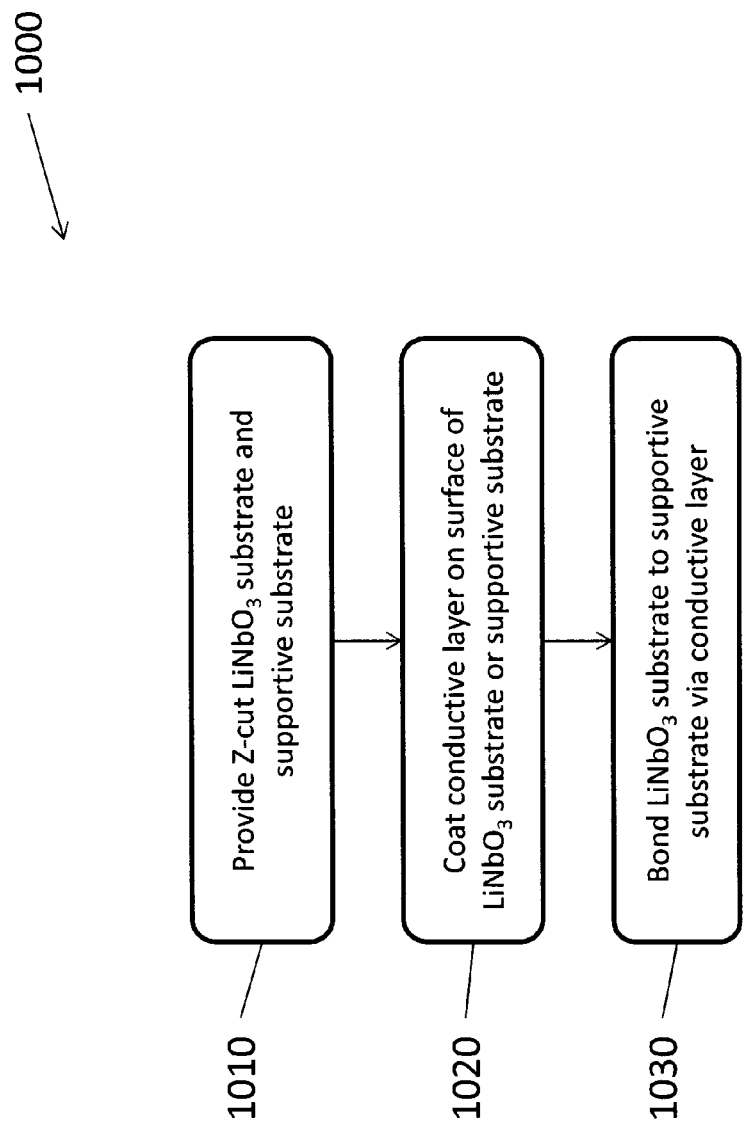
FIG. 10 illustrates steps in an exemplary method of forming a ground electrode on a lithium niobate waveguide device, according to some embodiments of the present invention.

In one illustrative embodiment, a ground electrode may be formed by steps in method 1000 illustrated in FIG. 10, wherein a supportive substrate is disposed on the lower surface of the lithium niobate substrate via a conductive layer which serves as the ground electrode. As mentioned above, a supportive substrate may physically support the lithium niobate substrate to reduce the chance of breakage of a waveguide device. The supportive substrate may be thicker than the lithium niobate substrate so as to provide adequate support.

Referring to FIG. 10, a lithium niobate substrate and a supportive substrate are provided (step 1010). The lithium niobate substrate may be obtained as described in step 910. The supportive substrate may be formed of any electrically insulative material, such as glass, silicon dioxide, and polymers. In some embodiments, the supportive substrate is a Z-cut lithium niobate crystal having a thickness of 0.5 mm or 1.0 mm.

A conductive layer then is coated on surface of the lithium niobate substrate or the supportive substrate (step 1020). The conductive layer may be formed using any of a number of known methods of adhering metal to substrate materials, such as electroplating or sputtering, and may be formed of any suitable material, such as described in step 920. Alternatively, a conductive layer may be coated onto a surface of each of the substrates.

The lithium niobate substrate is bonded to the supportive substrate via the conductive layer (step 1030). Such bonding may be achieved via any suitable techniques known to the art, such as bonding by a eutectic material. In an exemplary embodiment, the substrates are stacked on top of each other with a Ti—Ni—Sn—Au layer between the substrates to form an assembly. The assembly then is slowly heated to about 320° C. such that the Sn and Au within the layer forms an 80/20 eutectic that bonds both substrates together and forms the conductive layer. In another exemplary embodiment, the substrates are stacked on top of each other with a Ti—Ni—Sn—Au conductive layer and a thin indium foil in between. The assembly then is heated to 200° C. for the Ti—Ni—Sn—Au coating and indium foil so as to form the conductive layer, which also bonds the substrates together.

Referring back to FIG. 9, an optical waveguide may be formed within the lithium niobate substrate (step 930). The optical waveguide may be formed through a soft proton exchange process such as described in greater detail below with reference to FIGS. 11-12 and as described in U.S. Pat. No. 8,189,981. Alternatively, the optical waveguide may be formed by other suitable methods known in the art, such as by indiffusion of titanium (Ti) at temperatures near 1000° C. as disclosed in McBrien, or by proton exchange methods such as known in the art.

A signal electrode may be formed on the upper surface of the lithium niobate substrate and parallel to the optical waveguide (step 940). A signal electrode may include any suitable conductive material, such as gold, aluminum, copper, silver, titanium, Ti—Ni—Sn—Au, or a gold-tin eutectic material, or a semiconductive material, such as silicon. The signal electrode may be formed using any of a number of known methods of adhering a material to a substrate. For example, an adhesion layer, such as Ti, may be deposited on the substrate, followed by the deposition of a base layer of the material of the signal electrode. The electrode may be defined photolithographically or using another suitable patterning method. In one embodiment, gold is deposited using electroplating or sputtering techniques, optionally including a thin layer of titanium to improve the adhesion of the gold to the substrate. A signal electrode may have a width between 1-15 microns, and a thickness of about 1-15 microns, or other suitable dimensions.

A pair of guard electrodes are formed on the upper surface of the lithium niobate substrate and flanking, but spaced apart from, the signal electrode (step 950). The guard electrodes may be formed using a common set of processes as the signal electrode; that is, steps 940 and 950 may be performed concurrently. Alternatively, guard electrodes may be formed in a step separate from that of 940, from a material selected independently from that of signal electrode. In some embodiments, guard electrodes may be between 1-50 microns wide, and have a thickness of between 1-15 microns, for example, or other suitable dimensions.

The optical waveguide may be coupled to a light source; the signal electrode and the guard electrodes may be coupled to the signal terminal of a driving signal generator; and the conductive layer may be coupled to the ground terminal of the driving signal generator (step 960), e.g., in a manner such as described above with reference to FIG. 3.

Light through the optical waveguide may be modulated by applying a driving signal to the signal electrode and guard electrodes (step 970). For example, referring back to FIG. 2, light within waveguide 202 may be modulated by applying a voltage between signal electrode 203 and conductive layer 205 using driving signal generator 209. Or, for example, referring back to FIG. 8, light in sections 802a, 802b of waveguide 802 may be recombined (not shown), where they interfere with one another. Because the relative phase of the light portions traveling through waveguide sections 802a, 802b may be controlled via signal generator, the intensity of the recombined light may be modulated as desired.

It is believed that the lithium niobate waveguide device suitably may be used in vacuum for more than 100 days without degradation of performance (step 980). As noted above, in the electrode configuration of the present devices, the conductive layer may serve as a ground electrode or ground plane for the signal electrode and the guard electrodes. The electric field which is induced between the signal electrode and the conductive layer may be kept away from, and normal to, the upper surface of the device, thereby inhibiting the formation of mobile surface charges and flow of such charges. Additionally, the guard electrodes, flanking the signal electrode and working in concert with the conductive layer, may push, attract, or pull the buildup of any space charges to regions away from the signal electrode and the optical waveguide. Because such an electrode configuration may inhibit formation of mobile surface charges, may inhibit mobile charges from accumulating near the optical waveguide, and may inhibit surface charges from interfering with the applied electric field, the device is believed to be significantly less susceptible to DC drift than previously known devices and its bias voltage is believed to be substantially invariable over time.

It should be appreciated that the steps of method 900 may be performed in any suitable order. For example, the waveguide may be formed before the ground electrode. Indeed, the ground electrode may be formed after the signal electrode, or after the guard electrodes.

Structure of Optical Waveguide Formed Through Soft Proton Exchange

In some embodiments, optical waveguide 202 may be formed using a "soft proton exchange" process such as described in U.S. Pat. No. 8,189,981, the entire content of which are incorporated by reference herein. Specifically, the waveguide may be formed using a combination of steps that, together, reduce or eliminate many of the aforementioned problems associated with previously known lithium niobate waveguides, particularly drift in the refractive index and electrical conductivity, or complexity of fabrication. These steps include a "soft" proton exchange process in an acid for changing the refractive index of the lithium niobate substrate, in which a moderate amount of lithium ions is provided in the acid for the proton exchange. For example, a solution of lithium benzoate in benzoic acid may be used. The lithium ions slow the proton exchange process, allowing the protons to diffuse deeper into the substrate and reducing or avoiding stresses associated with mismatch between the waveguide and the substrate.

Following soft proton exchange, the substrate is annealed under a preselected vapor pressure of water, which performs numerous functions. First, the anneal step heals defects caused by the soft proton exchange process, which are already reduced because of the low proton density. The vapor pressure of water during the anneal step also inhibits or prevents the evaporation of water from the waveguide, thus inhibiting or preventing shrinkage and/or the formation of undesired defects within the crystal. Additionally, the protons, which are already relatively well diffused through the substrate because of the soft proton exchange process, may continue to diffuse through the substrate, further reducing stresses resulting from crystal lattice mismatch between the waveguide and the underlying substrate. The upper surface of the waveguide is then "sealed" by performing a reverse proton exchange, which exchanges protons near the upper surface of the waveguide with lithium ions. By reducing or eliminating the presence of protons near the upper surface of the waveguide, the dehydration of the waveguide under normal operating conditions may be inhibited, greatly enhancing the stability of the waveguide. It is believed that such waveguides suitably may be used in waveguide devices such as described above with reference to FIGS. 2, 3, and 8.

Figure 11:
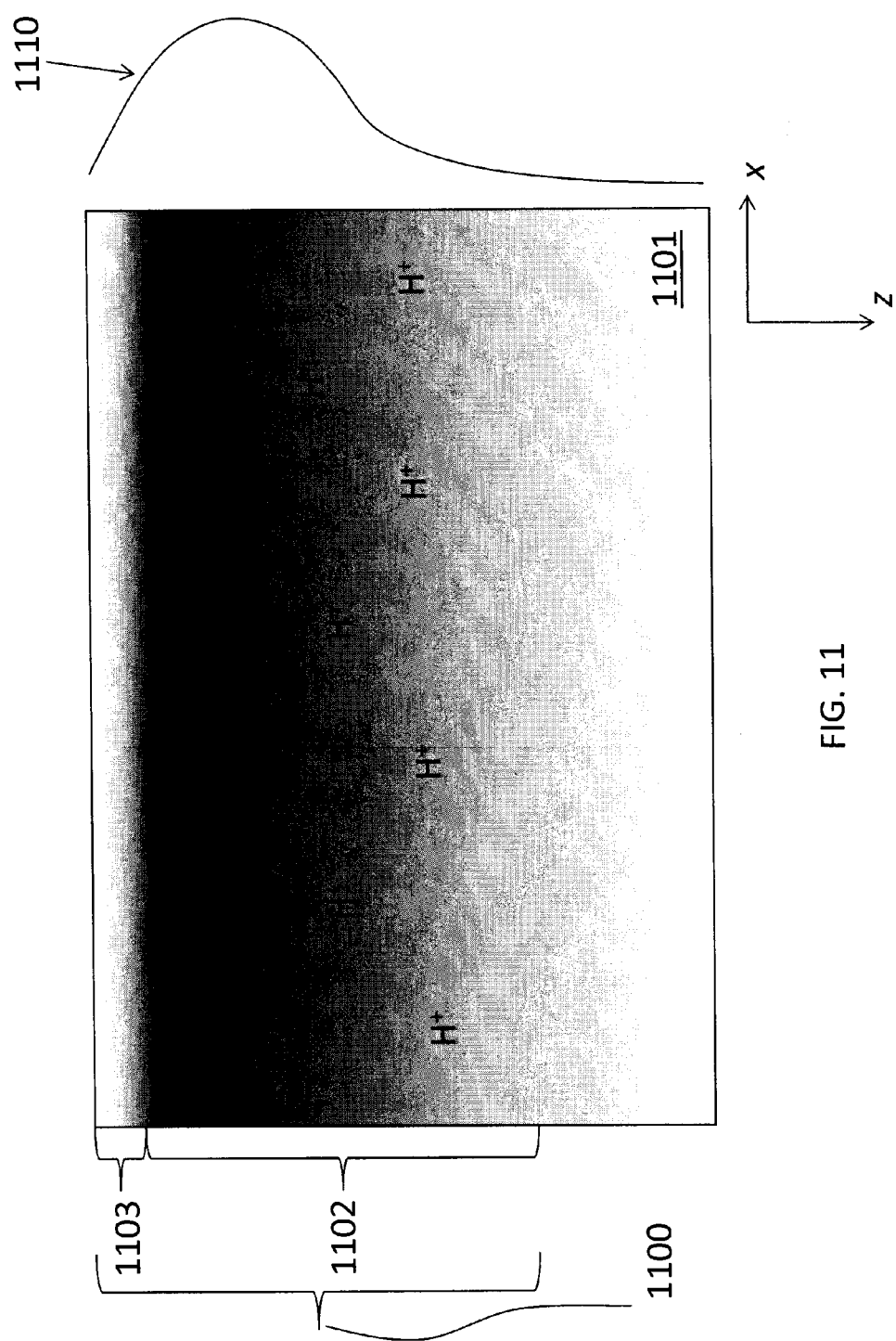
FIG. 11 schematically illustrates a cross-section of an exemplary waveguide that may be used in a lithium niobate waveguide device, according to some embodiments of the present invention.

Referring to FIG. 11, a waveguide 1100 prepared according to some embodiments of the present invention is described. Waveguide 1100 is formed in lithium niobate substrate 1101 and includes soft proton-exchanged layer 1102 and lithium niobate overlayer 1103. Soft proton-exchanged layer 1102 is disposed over, and in contact with, substrate 1101. The transition between substrate 1101 and soft proton-exchanged layer 1102 may be sufficiently gradual as to reduce stress resulting from a crystal lattice mismatch between the layer 1102 and substrate 1101. In some embodiments, there is essentially no stress resulting from such a mismatch, nor crystalline defects arising from such a mismatch. Lithium niobate overlayer 1103 is disposed over, and in contact with, soft proton-exchanged layer 1102. The transition between lithium niobate overlayer 1103 and soft proton-exchanged layer 1102 may be sufficiently gradual as to reduce stress resulting from a crystal lattice mismatch between the overlayer 1102 and layer 1103. In some embodiments, there is essentially no stress resulting from such a mismatch, nor crystalline defects arising from such a mismatch. Thus, in some embodiments, the waveguide has substantially no crystalline defects, even close to the upper surface, e.g., within about 15 nm of the upper surface of the substrate, or within about 10 nm of the upper surface of the substrate, or within about 5 nm of the upper surface of the substrate, or within about 2 nm of the upper surface of the substrate.

During use, light introduced to waveguide 1100 is substantially contained within soft proton-exchanged layer 1102, about which lithium niobate overlayer 1103 and substrate 1101 act as cladding, resulting in smoothly varying optical profile 1110. The waveguide may carry, with low loss, a variety of optical wavelengths, e.g., any wavelengths within the visible and/or communication bands. In some embodiments, the optical wavelengths carried by the waveguide are in the communication band, e.g., between 1520 and 1650 nm. Because soft proton-exchanged layer 1102 and overlayer 1103 are each substantially defect free, there are substantially no diffusive paths by which protons in layer 1102 may reach the upper surface of overlayer 1103. Thus, such protons may neither increase stress in the sample, nor bond to oxygen atoms to form water at the upper surface of overlayer 1103. In contrast, protons in previously known lithium niobate waveguides may be gradually transported to the upper surface of the waveguide, e.g., via diffusion paths made available by cracks or defects in the crystalline lattice, where they may form water and evaporate. It should be noted that other types of waveguides suitably may be used in the present waveguide devices.

Method of Forming Optical Waveguide Through Soft Proton Exchange

1. Sample Preparation

Figure 12:
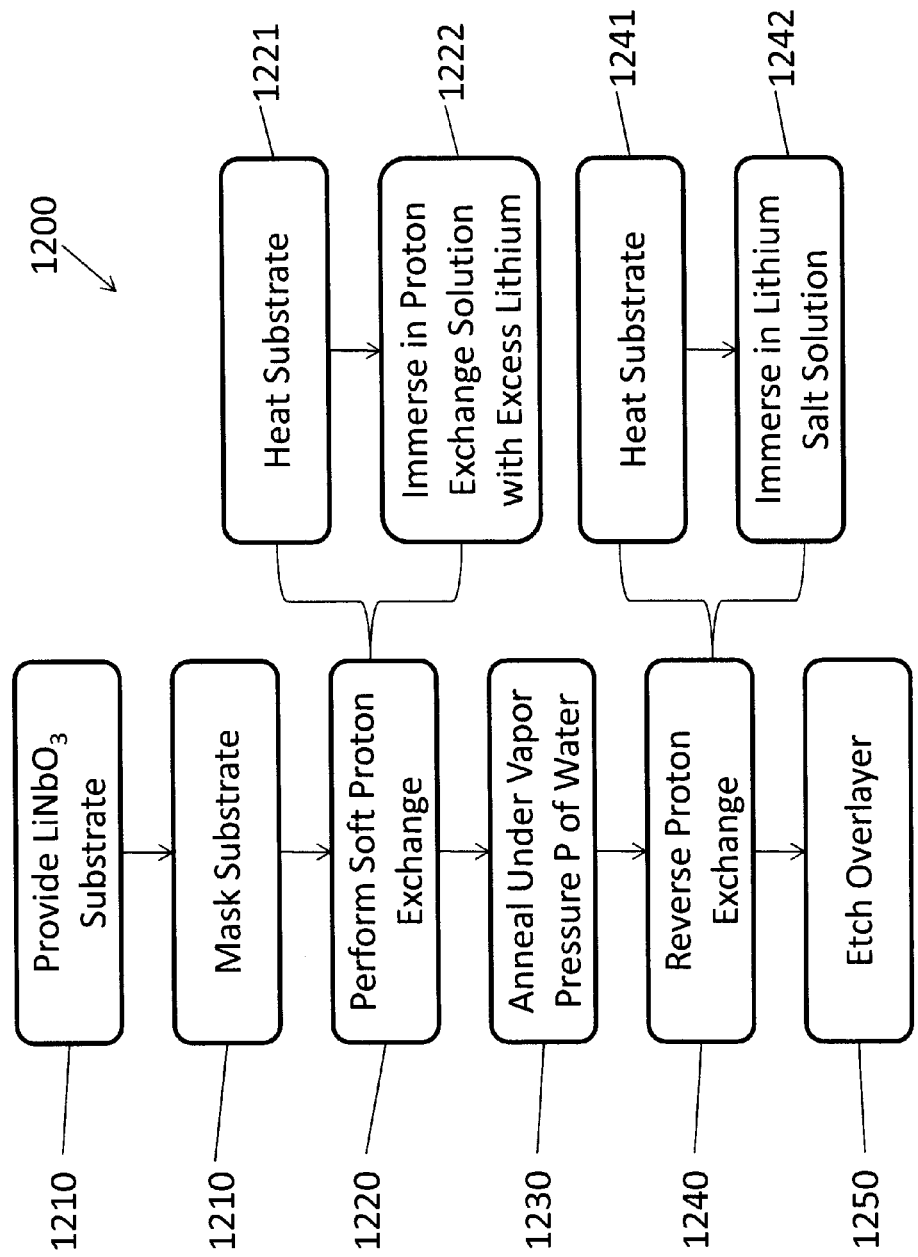
FIG. 12 illustrates steps in a method for preparing an exemplary waveguide that may be used in a lithium niobate waveguide device.

FIG. 12 illustrates steps in a method 1200 for forming a stable lithium niobate waveguide, such as illustrated in FIG. 11. First, a lithium niobate (LiNbO$_3$) substrate is provided (step 1210). Substrates that are substantially defect free, and of optical quality, may be commercially purchased, for example, from Crystal Technology, Inc. (Palo Alto, Calif.). In some embodiments, the lithium niobate substrate is a commercially purchased Z-cut lithium niobate crystal having a thickness of 0.5 mm or 1.0 mm.

2. Soft Proton Exchange

A soft proton exchange is performed on the substrate (step 1220), which may include heating the substrate (step 1221) and immersing the substrate in a proton exchange solution with excess lithium (step 1222). This proton exchange step is referred to herein as "soft" because the substrate is exposed to a solution that contains both an acid and excess lithium ions (i.e., lithium ions other than those that leave the substrate upon proton exchange). In contrast, in a "hard" proton exchange the substrate would be exposed to a solution lacking excess lithium ions. The chemical reaction in both soft and hard proton exchange is substantially the same, but the presence of the excess lithium ions in the soft proton exchange changes the kinetics of the reaction. For example, if the solution to which the substrate is exposed contains benzoic acid ($C_6H_6$—COOH), then the reaction pathway for proton exchange is as follows:

$$C_6H_6COOH + LiNbO_3 \leftarrow\rightarrow H\text{—}NbO_3 + C_6H_6COOLi \quad (2)$$

Thus, during the proton exchange, benzoic acid and lithium niobate are in an equilibrium reaction with hydrogen niobate (also referred to as niobic acid) and lithium benzoate. This reaction occurs on the surface of the substrate exposed to the solution; as protons at the surface diffuse downward into the crystal, the reaction is driven forward. As such, adding an appropriate amount of additional lithium ions to the benzoic acid solution, e.g., in the form of lithium benzoate, may sufficiently shift the equilibrium of the reaction back towards the left to slow, but not stop, the reaction. As such, the protons may diffuse more deeply into the substrate, resulting in a lower proton concentration and reduced lattice distortion.

The concentration of excess lithium ions in the solution may be selected to maintain a sufficiently low concentration of protons at the substrate surface to substantially avoid the formation of defects, while still allowing the reaction to occur on a commercially feasible time frame. In some embodiments, the solution to which the substrate is exposed contains about 98% to about 94% by weight of a proton exchange acid, and about 2% to about 6% by weight of the lithium salt of that acid. In other embodiments, the solution to which the substrate is exposed contains about 97% to about 95% by weight of a proton exchange acid, and about 3% to about 5% by weight of the lithium salt of that acid. In still other embodiments, the solution to which the substrate is exposed contains about 96.5% to about 95.5% by weight of a proton exchange acid, and about 3.5% to about 4.5% by weight of the lithium salt of that acid. In one embodiment, the solution contains about 96% by weight of a proton exchange acid, and about 4% by weight of the lithium salt of that acid.

Because the reaction proceeds more slowly in the presence of excess lithium than would a hard proton exchange, the reaction time may be increased relative to a hard proton exchange. In one embodiment, the substrate is immersed in the soft proton exchange solution for greater than 12 hours, or greater than 24 hours, or greater than 36 hours. A variety of proton exchange acids, and the lithium salts of those acids, may be used. Examples of suitable proton exchange acids include, but are not limited to, tartaric acid, malic acid, and benzoic acid; the corresponding lithium salts are lithium tartrate, lithium malate, and lithium benzoate. One example of a suitable proton exchange acid, and its corresponding lithium salt, is benzoic acid and lithium benzoate.

The soft proton exchange may be performed, for example, at any temperature sufficient for protons to diffuse through the substrate on a commercially feasible time frame, without damaging the substrate or causing the acid or lithium salt to decompose. For example, the soft proton exchange may be performed at any suitable temperature between 200° C. and 500° C., e.g. between 220° C. and 400° C., or, e.g., between 200° C. and 250° C., or at any other suitable temperature. In preferred embodiments, the temperature is between the atmospheric melting point and the atmospheric boiling point of the proton exchange solution. For example, the atmospheric melting point of benzoic acid is about 122° C., and its atmospheric boiling point is about 250° C. It may be useful to perform the soft proton exchange between these two temperatures, and at atmospheric pressure, instead of using temperatures over the atmospheric boiling point of benzoic acid, which may require pressurization to avoid vaporizing the solution. In one illustrative embodiment, the soft proton exchange is performed using a solution of 2% to 6% lithium benzoate in benzoic acid, at atmospheric pressure, at a temperature between about 200° C. and 250° C. Of course, the soft proton exchange could be performed under pressure and above the atmospheric boiling point of the solution, if desired. The appropriate temperature and reaction time may vary, depending on the pressure under which the reaction is performed, the concentration of lithium ions, and the proton exchange acid and lithium salt selected.

3. Anneal

Referring still to FIG. 12, after the soft proton exchange is completed, the substrate is annealed under a water vapor pressure P (step 1230). Such annealing may heal any distortions to the crystalline lattice that may have been caused during the soft proton exchange step, because such distortions will be smaller and fewer than would have occurred during a hard proton exchange. Annealing a soft proton-exchanged layer results in a crystalline lattice of significantly higher quality than may be obtained by annealing a hard proton-exchanged layer.

Additionally, performing the anneal under a controlled vapor pressure P of water inhibits the evaporation of water that forms chemically on the surface. It is known that lithium niobate decomposes at high temperature (greater than 500° C.) according to the following reaction:

$$3LiNbO_3 \leftrightarrow Li_2O + LiNb_3O_8 \qquad (3)$$

Because this is an equilibrium reaction, if the reaction products remain near each other, they may eventually react with each other to form lithium niobate. Without wishing to be bound by any theory, the inventors believe that a crystal containing both lithium niobate and hydrogen niobate may undergo a reaction analogous to reaction (3):

$$LiNbO_3 + 2HNbO_3 \leftrightarrow H_2O + LiNb_3O_8 \qquad (4)$$
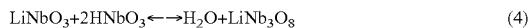

Under reaction (4), if the water evaporates from the surface, it will drive the reaction in the forward direction, increasing the conversion of lithium niobate and hydrogen niobate into water and $LiNb_3O_8$. The $LiNb_3O_8$ has a different crystal structure than lithium niobate and is not electro-optically active, so its formation may degrade the performance of the remaining crystal. Without wishing to be bound by theory, it is believed that this reaction may cause at least some of the performance degradation of conventional lithium niobate waveguides. Specifically, the waveguide may become dehydrated as protons and oxygen atoms in the waveguide bond together to form water, which may evaporate. Such dehydration may cause the waveguide layer to shrink, enhancing the lattice mismatch between the crystalline lattices of the proton exchanged layer and the substrate, increasing stress and defects.

The inventors recognized that by performing an anneal step under the appropriate vapor pressure of water, reaction (4) may be driven in the reverse direction, reducing or inhibiting the formation of water and $LiNb_3O_8$, and preserving the crystalline quality of the lithium niobate and hydrogen niobate. In particular, inhibiting the formation and evaporation of water (which contains oxygen) may preserve an approximately 3:1 stoichiometric ratio of oxygen to niobium in the crystal. The particular dependence of the oxygen to niobium ratio to water vapor pressure may vary somewhat based on the temperature selected for the anneal, and the composition of the crystal following the soft proton exchange step. Additionally, if it is desired to prepare a waveguide having a stoichiometric oxygen to niobium ratio other than 3:1, e.g., 2.5:1, 3.5:1, or any other desired ratio, this ratio may easily be selected by adjusting the vapor pressure of water during the anneal.

In some embodiments, the applied vapor pressure P of water may range, for example, between about 0.2 and about 1 atm; or, for example, between about 0.3 and about 0.8 atm; or, for example, between about 0.4 and about 0.7 atm; or, for example, between about 0.45 atm and about 0.55 atm; or, for example, about 0.47 atm. The temperature of the anneal may be, for example, between 225° C. and 450° C., e.g., between 250° C. and 425° C., e.g., between 275° C. and 400° C., e.g., between 300° C. and 375° C., or, e.g., between 300° C. and 350° C., or, e.g., about 320° C., or any other suitable temperature. The anneal may be performed for any suitable amount of time, e.g., for between 10 hours and 200 hours, or for between 30 hours and 120 hours, or for between 50 hours and 100 hours. The anneal may be performed in an enclosed vessel such as a quartz, sapphire, or steel ampoule.

4. Reverse Proton Exchange

Referring again to FIG. 12, following anneal at 1230, the substrate may be subjected to a reverse proton exchange process (step 1240). During such a reverse proton exchange, the substrate may be heated (step 1241) and then immersed in a lithium salt solution (step 1242), e.g., using techniques and equipment analogous to those used for the soft proton exchange described above. The reverse proton exchange may be performed at any temperature at which lithium ions that react at the substrate surface may diffuse to a sufficient depth within a commercially feasible time frame, for example, between 200° C. and 500° C., e.g. between 250° C. and 450° C., e.g., between 300° C. and 400° C., or, e.g., between 250° C. and 300° C., or at any other suitable temperature. Because lithium diffuses relatively slowly, and because the soft proton-exchanged layer contains few if any defects, the reaction may take greater than 12 hours, or greater than 24 hours, or greater than 36 hours to provide a sufficiently thick overlayer of lithium niobate to protect the underlying soft proton-exchanged layer under the intended operating conditions.

A variety of lithium salts may be suitable for a reverse proton exchange reaction, including lithium nitrate, and a eutectic mixture of lithium nitrate, potassium nitrate, and sodium nitrate. If the lithium salt is lithium nitrate ($LiNO_3$), then the reaction proceeds as follows:

$$HNbO_3 + LiNO_3 \leftrightarrow HNO_3 + LiNbO_3 \qquad (5)$$
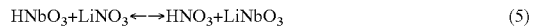

Thus, at the upper surface of the substrate, a portion of the soft proton-exchanged layer formed in steps 1220 and 1230 is replaced with a thin overlayer of lithium niobate. During use, the lithium niobate overlayer protects the underlying soft proton-exchanged layer. Specifically, because the upper surface of the substrate contains substantially no hydrogen niobate, i.e., consists essentially of lithium niobate, then reaction (4) above may not take place and water may not form during normal operation of the waveguide, thus inhibiting dehydration. Additionally, because the lithium niobate overlayer is substantially defect free, there are substantially no paths for hydrogen in the underlying soft proton-exchanged layer to migrate to the surface to form water. As such, the resultant waveguide exhibits a high stability in a wide variety of operating environments.

The combination of soft proton exchange, anneal under water vapor pressure, and reverse proton exchange can thus be seen to produce waveguides having few, if any, defects;

few, if any, protons at the surface; and a high proportion of protons deep within the waveguide. Such waveguides are expected to be extremely reliable in a variety of operating conditions, and are also expected to have a superior optical mode profile.

5. Etch

Referring again to FIG. 12, the top surface of the lithium niobate overlayer optionally may be etched (step 1250), for example, by immersing the substrate into an aqueous solution of 1% hydrogen fluoride (HF) at room temperature for 30-60 seconds. As such, an essentially defect free overlayer may be provided, having a low electrical conductivity and having sufficient thickness to protect the underlying soft proton-exchanged layer during use.

OTHER EMBODIMENTS

Embodiments of the present invention provide lithium niobate waveguide devices that are stable in a wide variety of environments. As noted above, previously known lithium niobate waveguides may be provided with complex circuitry to compensate for drifts in the bias voltage. Some embodiments of the present invention may not need to use such circuitry, because essentially no drift in electrical bias is expected under normal operating conditions. For example, it is believed that at least some embodiments of the stable waveguide devices may be expected to operate successfully for over 100 days, or even for over a year, without the need for bias adjustments or complex compensation circuitry.

While preferred embodiments of the invention are described herein, it will be apparent to one skilled in the art that various changes and modifications may be made. For example, it should be understood that the stable waveguide devices may have any one of a variety of configurations and are not limited to the particular configurations illustrated in FIGS. 2, 3, and 8. The appended claims are intended to cover all such changes and modifications that fall within the true spirit and scope of the invention.

What is claimed is:

1. A waveguide device, comprising:
    a Z-cut lithium niobate substrate having an upper surface and a lower surface;
    an optical waveguide embedded within the lithium niobate substrate;
    a signal electrode disposed on the upper surface of the lithium niobate substrate and parallel to the optical waveguide;
    first and second guard electrodes disposed on the upper surface of the lithium niobate substrate and flanking the signal electrode and respectively spaced apart from the signal electrode by first and second gaps; and
    a substantially contiguous conductive layer disposed on the lower surface of the lithium niobate substrate and disposed beneath the signal electrode, the first and second guard electrodes, and the first and second gaps and configured to provide a common ground for the signal electrode and the first and second guard electrodes.

2. The waveguide device of claim 1, wherein the conductive layer comprises a metal.

3. The waveguide device of claim 1, wherein the conductive layer comprises aluminum, gold, copper, silver, titanium, Ti—Ni—Sn—Au, or a gold-tin eutectic material.

4. The waveguide device of claim 1, wherein the thickness of the lithium niobate substrate is between 10 microns and 100 microns.

5. The waveguide device of claim 1, further comprising a supportive substrate bonded to the lithium niobate substrate by the conductive layer.

6. The waveguide device of claim 5, wherein the supportive substrate comprises a Z-cut lithium niobate substrate.

7. The waveguide device of claim 6, wherein a thickness of the lithium niobate substrate is less than a thickness of the supportive substrate.

8. The waveguide device of claim 1, wherein the waveguide comprises:
    a layer embedded within the substrate, the layer comprising protons, and
    an overlayer comprising lithium niobate, the overlayer embedded between the upper surface of the layer and the upper surface of the lithium niobate substrate,
    wherein the overlayer comprises a region of substantially defect free lithium niobate extending between about 10 nm below the upper surface of the substrate and the layer.

9. The waveguide device of claim 1, wherein the signal electrode is coupled to a first driving signal;
    the pair of guard electrodes are coupled to a second driving signal;
    the conductive layer is coupled to a ground reference common to the first and second driving signals; and
    the optical waveguide is coupled to a light source.

10. The waveguide device of claim 9, wherein the second driving signal is a low frequency or DC-bias signal.

11. The waveguide device of claim 9, wherein the second driving signal is same as the first driving signal.

12. The waveguide device of claim 9, wherein the signal electrode and the conductive layer induce an electric field normal to the upper surface of the lithium niobate substrate, and wherein the guard electrodes keep surface charges away from the signal electrode and the optical waveguide.

13. A method of making a waveguide device, the method comprising:
    providing a Z-cut lithium niobate substrate having an upper surface and a lower surface;
    forming an optical waveguide within the lithium niobate substrate;
    forming a signal electrode on the upper surface of the lithium niobate substrate and parallel to the optical waveguide;
    forming first and second guard electrodes on the upper surface of the lithium niobate substrate and flanking the signal electrode and respectively spaced apart from the signal electrode by first and second gaps; and
    disposing a substantially contiguous conductive layer on the lower surface of the lithium niobate substrate, the conductive layer being disposed beneath the signal electrode, the first and second guard electrodes, and the first and second gaps and serving as a common ground for the signal electrode and the first and second guard electrodes.

14. The method of claim 13, further comprising thinning the lithium niobate substrate.

15. The method of claim 14, wherein said thinning comprises grinding and polishing the lithium niobate substrate.

16. The method of claim 13, wherein the thickness of the lithium niobate substrate is between 10 microns and 100 microns.

17. The method of claim 13, wherein the conductive layer comprises a metal.

18. The method of claim 13, wherein the conductive layer comprises aluminum, gold, copper, silver, titanium, Ti—Ni—Sn—Au, or a gold-tin eutectic material.

19. The method of claim 13, wherein disposing the conductive layer on the lower surface of the lithium niobate substrate comprises:
- providing a supportive substrate, the supportive substrate having an upper surface and a lower surface;
- coating the conductive layer on at least one of the lower surface of the lithium niobate substrate or the upper surface of the supporting substrate; and
- bonding the lower surface of the lithium niobate substrate to the upper surface of the supporting substrate via the conductive layer.

20. The method of claim 19, wherein the supportive substrate comprises a Z-cut lithium niobate substrate.

21. The method of claim 13, wherein forming the optical waveguide comprises:
- forming a soft proton-exchanged layer comprising hydrogen niobate by exposing the upper surface of the lithium niobate substrate to a soft proton-exchange solution, the soft proton-exchange solution comprising a proton exchange acid and a lithium salt of the proton exchange acid; and
- annealing the soft proton-exchanged layer under a vapor pressure of water preselected to inhibit protons in the hydrogen niobate from forming water and evaporating from the upper surface of the substrate.

* * * * *